(12) United States Patent
Marshall et al.

(10) Patent No.: US 8,303,874 B2
(45) Date of Patent: Nov. 6, 2012

(54) SOLUTION SPUN FIBER PROCESS

(75) Inventors: Larry R Marshall, Chesterfield, VA (US); Jack Eugene Armantrout, Richmond, VA (US); Tao Huang, Downingtown, PA (US); John R Moore, Leonard, MI (US); Neal Pfeiffenberger, Chambersburg, PA (US)

(73) Assignee: E I du Pont de Nemours and Company, Wilmington, DE (US)

( * ) Notice: Subject to any disclaimer, the term of this patent is extended or adjusted under 35 U.S.C. 154(b) by 527 days.

(21) Appl. No.: 11/593,959

(22) Filed: Nov. 7, 2006

(65) Prior Publication Data

US 2008/0029617 A1  Feb. 7, 2008

Related U.S. Application Data

(60) Provisional application No. 60/786,632, filed on Mar. 28, 2006.

(51) Int. Cl.
*D01D 5/04* (2006.01)
*D01D 5/18* (2006.01)

(52) U.S. Cl. ..... 264/204; 264/101; 264/205; 264/211.1; 264/211.14; 264/555

(58) Field of Classification Search ............ 264/204, 264/205
See application file for complete search history.

(56) References Cited

U.S. PATENT DOCUMENTS

| | | |
|---|---|---|
| 3,085,749 A | 4/1963 | Schweitzer et al. |
| 3,097,085 A | 7/1963 | Wallsten |
| 3,565,979 A | 2/1971 | Palmer |
| 4,211,736 A | 7/1980 | Bradt |
| 4,405,086 A | 9/1983 | Vetter |
| 4,798,335 A | 1/1989 | Tachi et al. |
| 4,919,333 A | 4/1990 | Weinstein |
| 4,937,020 A | 6/1990 | Wagner et al. |
| 5,494,616 A * | 2/1996 | Voelker et al. ............ 264/8 |
| 5,693,280 A * | 12/1997 | Pellegrin et al. ......... 264/211.1 |
| 5,934,574 A | 8/1999 | van der Steur |
| 6,187,891 B1 * | 2/2001 | Rautschek et al. .......... 528/25 |
| 6,524,514 B1 | 2/2003 | Volokitin et al. |
| 6,752,609 B2 | 6/2004 | Volokitin et al. |
| 7,118,698 B2 * | 10/2006 | Armantrout et al. ........ 264/205 |
| 2002/0089094 A1 | 7/2002 | Kleinmeyer et al. |
| 2004/0000604 A1 * | 1/2004 | Vetter et al. ................ 239/700 |
| 2004/0219345 A1 * | 11/2004 | Armantrout et al. ........ 428/219 |

(Continued)

FOREIGN PATENT DOCUMENTS

CN  14723732  3/2003

(Continued)

OTHER PUBLICATIONS

Martin Dauner, "Nanofibers for Filtration and Separation", $3^{rd}$ international symposium, "How to Enter Technical Textiles Markets 3", Ghent, Belgium, Nov. 17-18, 2005.

(Continued)

*Primary Examiner* — Joseph Del Sole
*Assistant Examiner* — Ryan Ochylski

(57) ABSTRACT

The invention relates to a process for forming fibers from a spinning solution utilizing a high speed rotary sprayer. The fibers can be collected into a uniform web for selective barrier end uses. Fibers with an average fiber diameter of less that 1,000 nm can be produced.

13 Claims, 6 Drawing Sheets

U.S. PATENT DOCUMENTS

| | | | |
|---|---|---|---|
| 2005/0106391 A1* | 5/2005 | Lawrence et al. | 428/375 |
| 2005/0136190 A1 | 6/2005 | Tani et al. | |
| 2006/0228435 A1 | 10/2006 | Andrady et al. | |
| 2007/0038290 A1* | 2/2007 | Huang et al. | 623/1.16 |
| 2010/0219563 A1 | 9/2010 | Chang et al. | |

FOREIGN PATENT DOCUMENTS

| | | |
|---|---|---|
| EP | 0 306 033 A2 | 3/1989 |
| EP | 0 584 060 B1 | 9/1996 |
| EP | 1999304 | 12/2010 |
| GB | 2 096 586 A | 10/1982 |
| JP | 09 192545 A | 7/1997 |
| WO | WO 92/20330 | 11/1992 |
| WO | WO 03042436 A1 * | 5/2003 |
| WO | WO2005/061763 | 7/2005 |
| WO | WO2007/110783 | 10/2007 |

OTHER PUBLICATIONS

International Newsletter Ltd., the 3$^{rd}$ international symposium How to Enter Technical Textiles Markets 3 Brochure and Registration Form and list of participants scheduled for Nov. 17-18, 2005 at Ghent, Belgium.

Martin Dauner, "Fortschritte in der Nanofaser-Erzeugung", 20. Hofer Vliesstoffage 2005, Hof, Germany, Nov. 9-10, 2005.

Internet posting at http://www.hofer-vliesstofftage.de/vortrag-2005.php of presentations for 20. Hofer Vliesstoffage 2005, see link to item 02: Program Schedule for 20, Hofer Vliesstoffage 2005 at Hof, Germany, Nov. 9-10, 2005.

Martin Dauner, "Centrifuge Spinning—a new technology to improve polymeric filter media", 8. Symposium Textile Filter, Chemnitz, Germany, Mar. 7-8, 2006 (slides and paper).

Listing of Abstracts and Topics for 8. Symposium Textile Filter, Chemnitz, Germany, Mar. 7-8, 2006.

Purchase Order from Bollig & Kemper GmbH Co. KG to Reiter GmbH Co, KG for Hochrotationsspruhsystems Centerbell dated Aug. 15, 2005; and Delivery Note from Reiter GmbH Co. KG to Bollig & Kemper for Hochrotationsspruhsystems dated Sep. 21, 2005.

Reiter GmbH Co. KG, Operating Manual for "Hochrotationssystem HR Center Bell mit Glockenhaube", pp. 1-6.

ITWRansburg, Service manual LN-9264-08 for AerobellTM, pp. 1, 35, and 51, Oct. 2008.

Translated (from German to English) portions of Opposition Brief filed on Sep. 29, 2011 by Reiter GmbH + Co. KG Oberflachentechnik opposing European Patent EP 1 999 304 B1.

* cited by examiner

SOLUTION SPUN FIBER PROCESS

BACKGROUND OF THE INVENTION

1. Field of the Invention

This invention relates to a process for forming fibers and fibrous webs. In particular, very fine fibers can be made and collected into a fibrous web useful for selective barrier end uses such as filters, battery separators, and breathable medical gowns.

2. Background of the Invention

Figure 1:
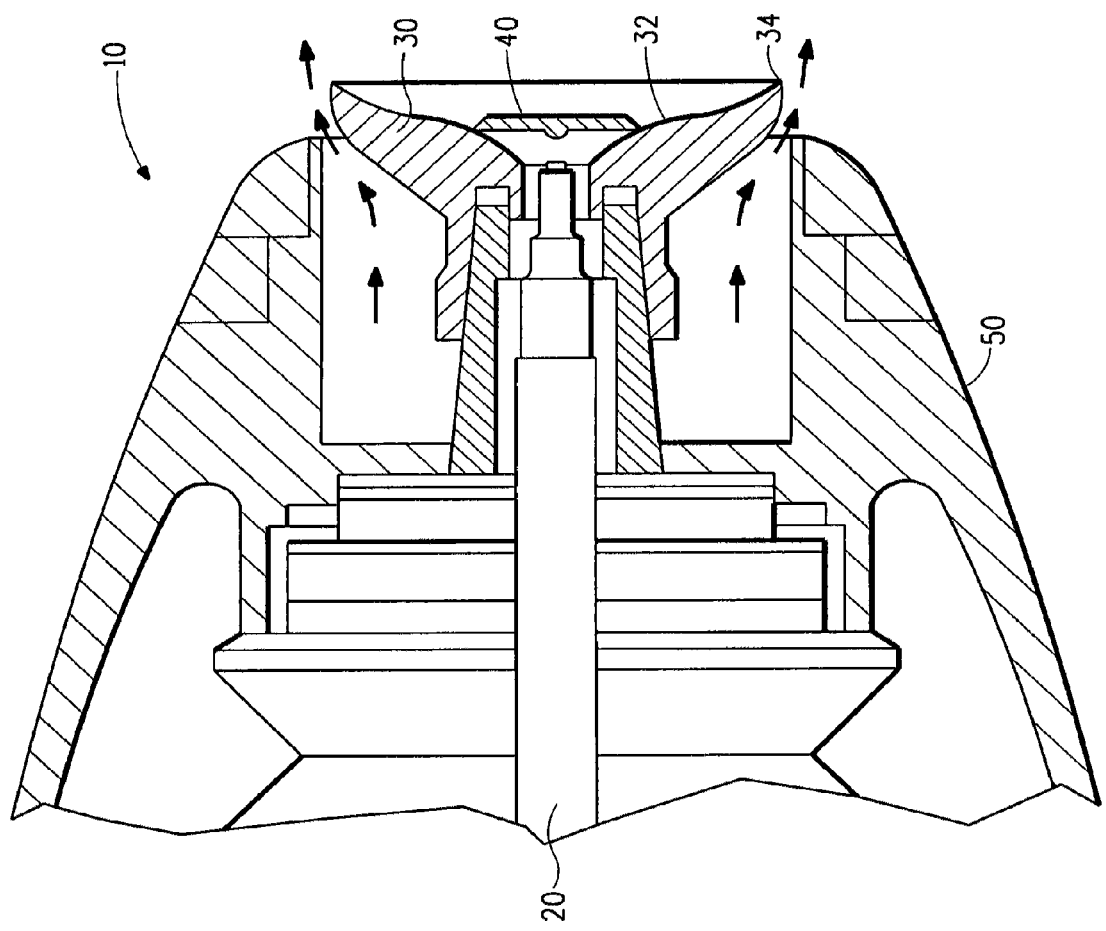

Rotary sprayers used in conjunction with a shaping fluid and an electrical field are useful in atomizing paint for coating a target device. The centrifugal force supplied by the rotary sprayers produces enough shear to cause the paint to become atomized and the shaping fluid and electrical field draw the atomized paint to the target device. This process has been optimized for the production of atomized droplets. Defects occur when too many atomized droplets agglomerate into larger entities. The prior art teaches toward making atomized droplets and not larger entities.

There is a growing need for very fine fibers and fibrous webs made from very fine fibers. These types of webs are useful for selective barrier end uses. Presently very fine fibers are made from melt spun “islands in the sea” cross section fibers, split films, some meltblown processes, and electrospinning. What is needed is a high throughput process to make very fine fibers and uniform fibrous webs.

SUMMARY OF THE INVENTION

The present invention provides a high throughput process to make very fine fibers and uniform webs by the use of a high speed rotary sprayer.

In a first embodiment, the present invention is directed to a fiber forming process comprising the steps of supplying a spinning solution having at least one polymer dissolved in at least one solvent to a rotary sprayer having a rotating conical nozzle, the nozzle having a concave inner surface and a forward surface discharge edge; issuing the spinning solution from the rotary sprayer along the concave inner surface so as to distribute said spinning solution toward the forward surface of the discharge edge of the nozzle; and forming separate fibrous streams from the spinning solution while the solvent vaporizes to produce polymeric fibers in the absence of an electrical field. A shaping fluid can flow around the nozzle to direct the spinning solution away from the rotary sprayer. The fibers can be collected onto a collector to form a fibrous web.

In a second embodiment, the present invention is directed to a fiber forming process comprising the steps of supplying a spinning solution having at least one polymer dissolved in at least one solvent to a rotary sprayer having a rotating conical nozzle, the nozzle having a concave inner surface and a forward surface discharge edge; issuing the spinning solution from the rotary sprayer along the concave inner surface so as to distribute said spinning solution toward the forward surface of the discharge edge of the nozzle; and forming separate fibrous streams from the spinning solution while the solvent vaporizes to produce polymeric fibers in the presence of an electrical field. A shaping fluid can flow around the nozzle to direct the spinning solution away from the rotary sprayer. The fibers can be collected onto a collector to form a fibrous web.

BRIEF DESCRIPTION OF THE DRAWINGS

FIG. 1 is an illustration of a nozzle portion of a rotary sprayer for forming fibers suitable for use in the present invention.

FIG. 2*a* is a scanning electron micrograph of poly(ethylene oxide) fibers made without an electrical field according to the process of the present invention.

FIG. 2*b* is a scanning electron micrograph of the fibers of FIG. 2*a* as they were distributed onto a collection scrim.

FIG. 3*a* is a scanning electron micrograph of poly(ethylene oxide) fibers made with an electrical field according to the process of the present invention.

FIG. 3*b* is a scanning electron micrograph of the fibers of FIG. 2*a* as they were distributed onto a collection scrim.

FIG. 4 is a scanning electron micrograph of poly(vinyl alcohol) fibers made with an electrical field according to the process of the present invention.

DETAILED DESCRIPTION OF THE INVENTION

The invention relates to a process for forming fibers from a spinning solution utilizing a rotary sprayer.

The spinning solution comprises at least one polymer dissolved in at least one solvent. Any fiber forming polymer able to dissolve in a solvent that can be vaporized can be used. Suitable polymers include polyalkylene oxides, poly(meth)acrylates, polystyrene based polymers and copolymers, vinyl polymers and copolymers, fluoropolymers, polyesters and copolyesters, polyurethanes, polyalkylenes, polyamides, polyaramids, thermoplastic polymers, liquid crystal polymers, engineering polymers, biodegradable polymers, bio-based polymers, natural polymers, and protein polymers. The spinning solution can have a polymer concentration of about 1% to about 90% by weight of polymer in the spinning solution. Also, in order to assist the spinning of the spinning solution, the spinning solution can be heated or cooled. Generally, a spinning solution with a viscosity from about 10 cP to about 100,000 cP is useful.

FIG. 1 is an illustration of a nozzle portion of a rotary sprayer 10 suitable for forming fibers from the spinning solution. A spinning solution is prepared by dissolving one or more polymers in one or more solvents. The spinning solution is pumped through a supply tube 20 running axially through the rotary sprayer 10. The throughput rate of the solution is from about 1 cc/min to about 500 cc/min. As the spinning solution exits the supply tube 20 it is directed into contact with a rotating conical nozzle 30 and travels along the nozzle's concave inner surface 32 until it reaches the nozzle's forward surface discharge edge 34. A rotational speed of conical nozzle 30 is between about 10,000 rpm and about 100,000 rpm. The conical nozzle 30 can be any conical-like shape having a generally concave inner surface, including a bell shape such as illustrated here, a cup shape or even a frusto-conical shape. The shape of the nozzle's concave inner surface 32 can influence the production of fibers. The cross section of the nozzle's concave inner surface 32 can be straight or curved. The shape of the nozzle's forward surface discharge edge 34 can also influence the production of fibers. The nozzle's forward surface discharge edge 34 can be sharp or rounded and can include serrations or dividing ridges. Optionally, a distributor disk 40 can be used to help direct the spinning solution from the supply tube 20 to the inner concave surface 32 of nozzle 30. The rotation speed of the nozzle propels the spinning solution along the nozzle's concave inner surface 32 and past the nozzle's forward surface discharge edge 34 to form separate fibrous streams, which are thrown off the discharge edge by centrifugal force. Simultaneously, the solvent vaporizes until fibers of the invention are formed. The fibers can be collected on a collector (not shown) to form a fibrous web.

Optionally, FIG. 1 shows shaping fluid housing 50 which guides shaping fluid (marked by arrows) around nozzle 30 to direct the spinning solution away from the rotary sprayer 10. The shaping fluid can be a gas. Various gases and at various temperatures can be used to decrease or to increase the rate of solvent vaporization to affect the type of fiber that is produced. Thus, the shaping gas can be heated or cooled in order to optimize the rate of solvent vaporization. A suitable gas to use is air, but any other gas which does not detrimentally affect the formation of fibers can be used.

Optionally, an electrical field can be added to the process. A voltage potential can be added between the rotary sprayer and the collector. Either the rotary sprayer or the collector can be charged with the other component substantially grounded or they can both be charged so long as a voltage potential exists between them. In addition, an electrode can be positioned between the rotary sprayer and the collector wherein the electrode is charged so that a voltage potential is created between the electrode and the rotary sprayer and/or the collector. The electrical field has a voltage potential of about 1 kV to about 150 kV. Surprisingly, the electrical field seems to have little effect on the average fiber diameter, but does help the fibers to separate and travel toward a collector so as to produce a more uniform fibrous web.

This process can make very fine fibers, preferably continuous fibers, with an average fiber diameter of less than 1,000 nm and more preferably from about 100 nm to 500 nm. The fibers can be collected on a collector into a fibrous web. The collector can be conductive for creating an electrical field between it and the rotary sprayer or an electrode. The collector can also be porous to allow the use of a vacuum device to pull vaporized solvent and optionally shaping gas away from the fibers and help pin the fibers to the collector to make the fibrous web. A scrim material can be placed on the collector to collect the fiber directly onto the scrim thereby making a composite material. For example, a spunbond nonwoven can be placed on the collector and the fiber deposited onto the spunbond nonwoven. In this way composite nonwoven materials can be produced.

Test Methods

In the description above and in the non-limiting examples that follow, the following test methods were employed to determine various reported characteristics and properties.

Viscosity was measured on a Thermo RheoStress 600 rheometer equipped with a 20 mm parallel plate. Data was collected over 4 minutes with a continuous shear rate ramp from 0 to 1,000 s$^{-1}$ at 23° C. and reported in cP at 10 s$^{-1}$.

Fiber Diameter was determined as follows. Ten scanning electron microscope (SEM) images at 5,000× magnification were taken of each nanofiber layer sample. The diameter of eleven (11) clearly distinguishable nanofibers were measured from each SEM image and recorded. Defects were not included (i.e., lumps of nanofibers, polymer drops, intersections of nanofibers). The average fiber diameter for each sample was calculated and reported in nanometers (nm).

EXAMPLES

Hereinafter the present invention will be described in more detail in the following examples.

Example 1 describes making a poly(ethylene oxide) continuous fiber without the use of an electrical field. Example 2 describes making a poly(ethylene oxide) continuous fiber with the use of an electrical field. Example 3 describes making a poly(vinyl alcohol) continuous fiber with the use of an electrical field.

Example 1

Figure 2A:
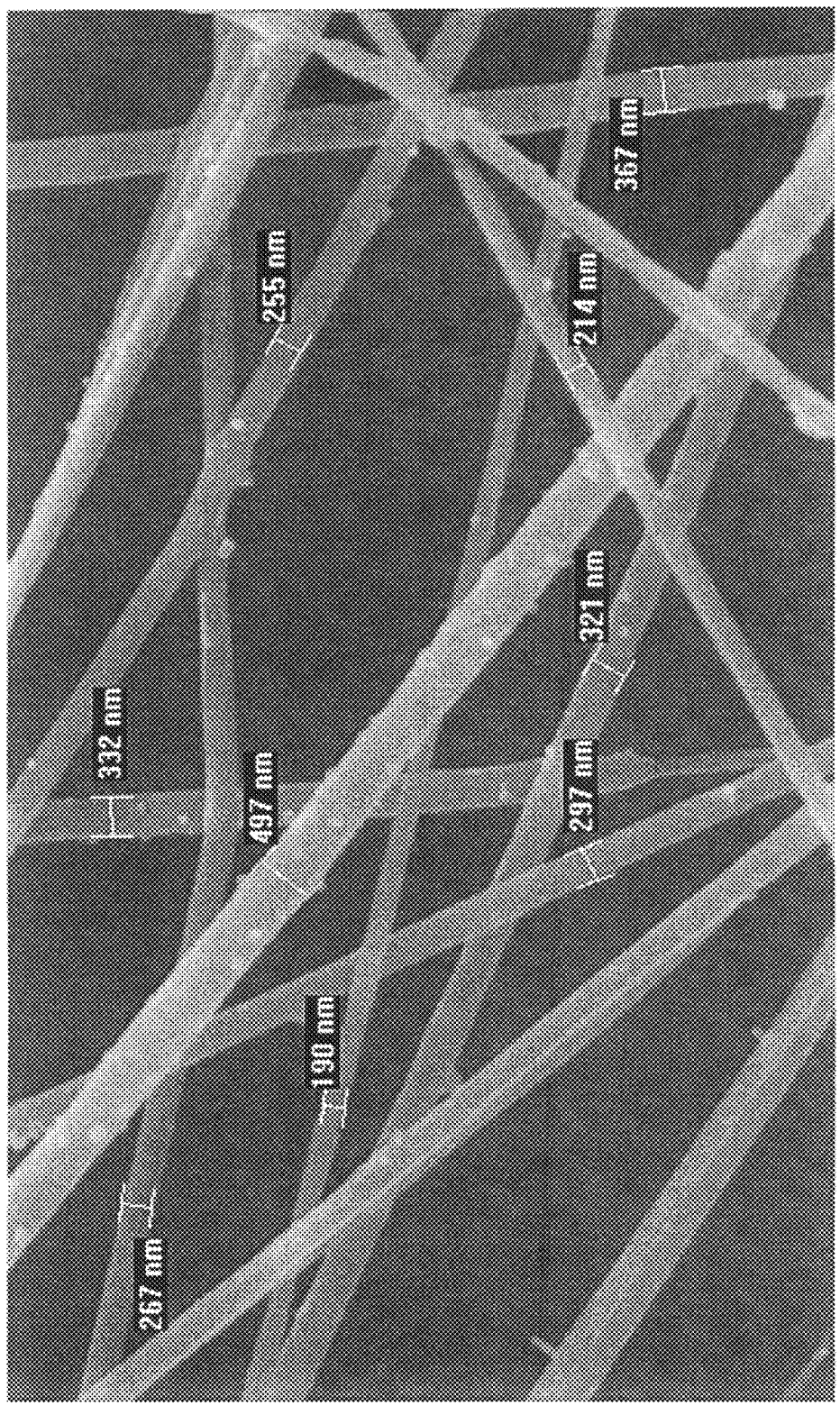
Figure 2B:
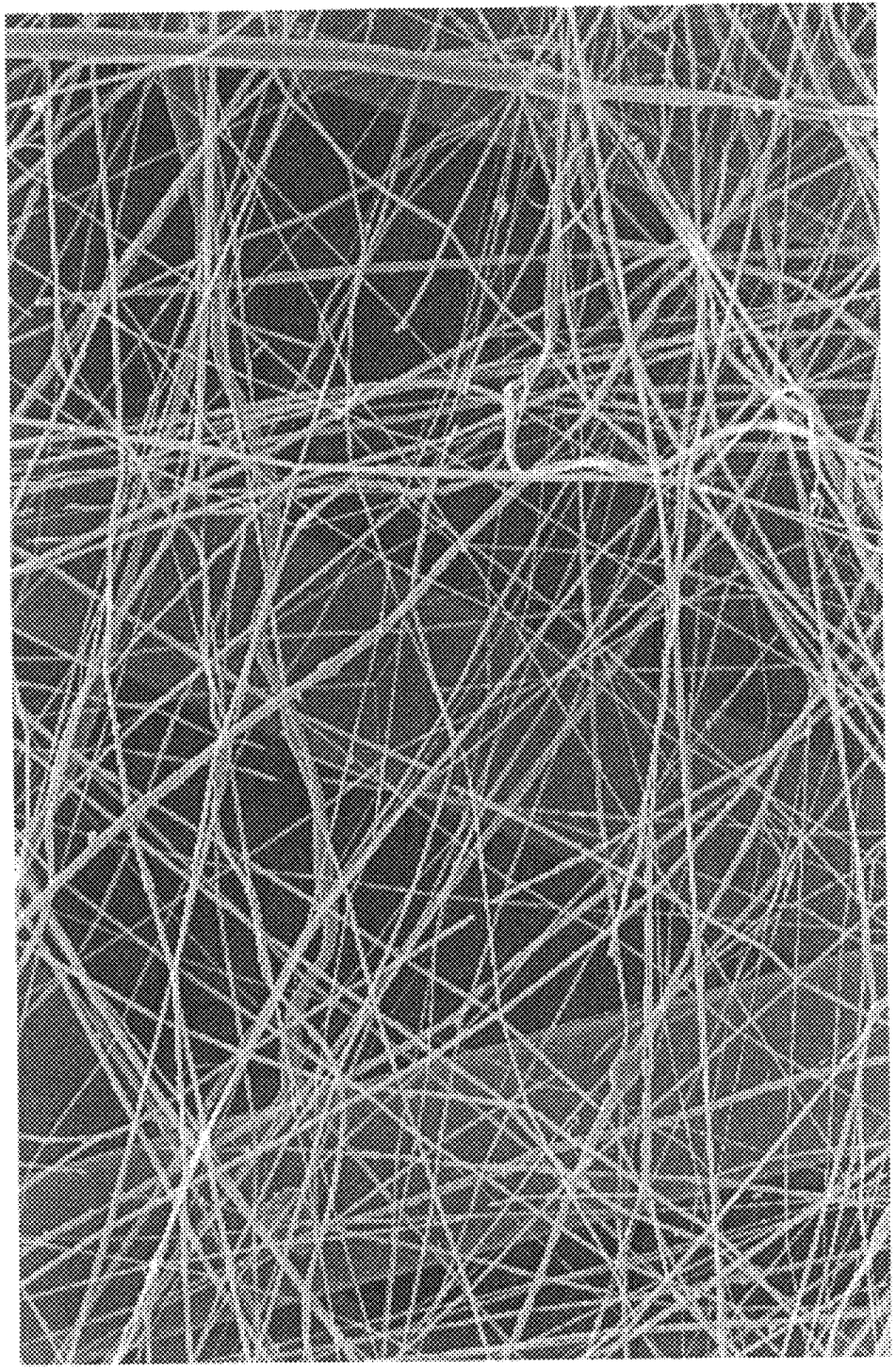

Continuous fibers were made using a standard Aerobell rotary atomizer and control enclosure for high voltage, turbine speed and shaping air control from ITW Automotive Finishing Group. The bell-shaped nozzle used was an ITW Ransburg part no. LRPM4001-02. A spinning solution of 10.0% poly(ethylene oxide) viscosity average molecular weight (Mv) of about 300,000, 0.1% sodium chloride, and 89.9% water by weight was mixed until homogeneous and poured into a Binks 83C-220 pressure tank for delivery to the rotary atomizer through the supply tube. The pressure on the pressure tank was set to a constant 15 psi. This produced a flow rate of about 2 cc/min. The shaping air was set at a constant 30 psi. The bearing air was set at a constant 95 psi. The turbine speed was set to a constant 40,000 rpm. No electrical field was used during this test. Fibers were collected on a Reemay nonwoven collection screen that was held in place 10 inches away from the bell-shaped nozzle by stainless steel sheet metal. The fiber size was measured from an image using scanning electron microscopy (SEM) and determined to be in the range of 100 nm to 500 nm, with an average fiber diameter of about 415 nm. An SEM image of the fibers can be seen in FIG. 2a. FIG. 2b is a SEM image which shows the distribution of the fibers spun according to this Example on the Reemay scrim.

Example 2

Figure 3A:
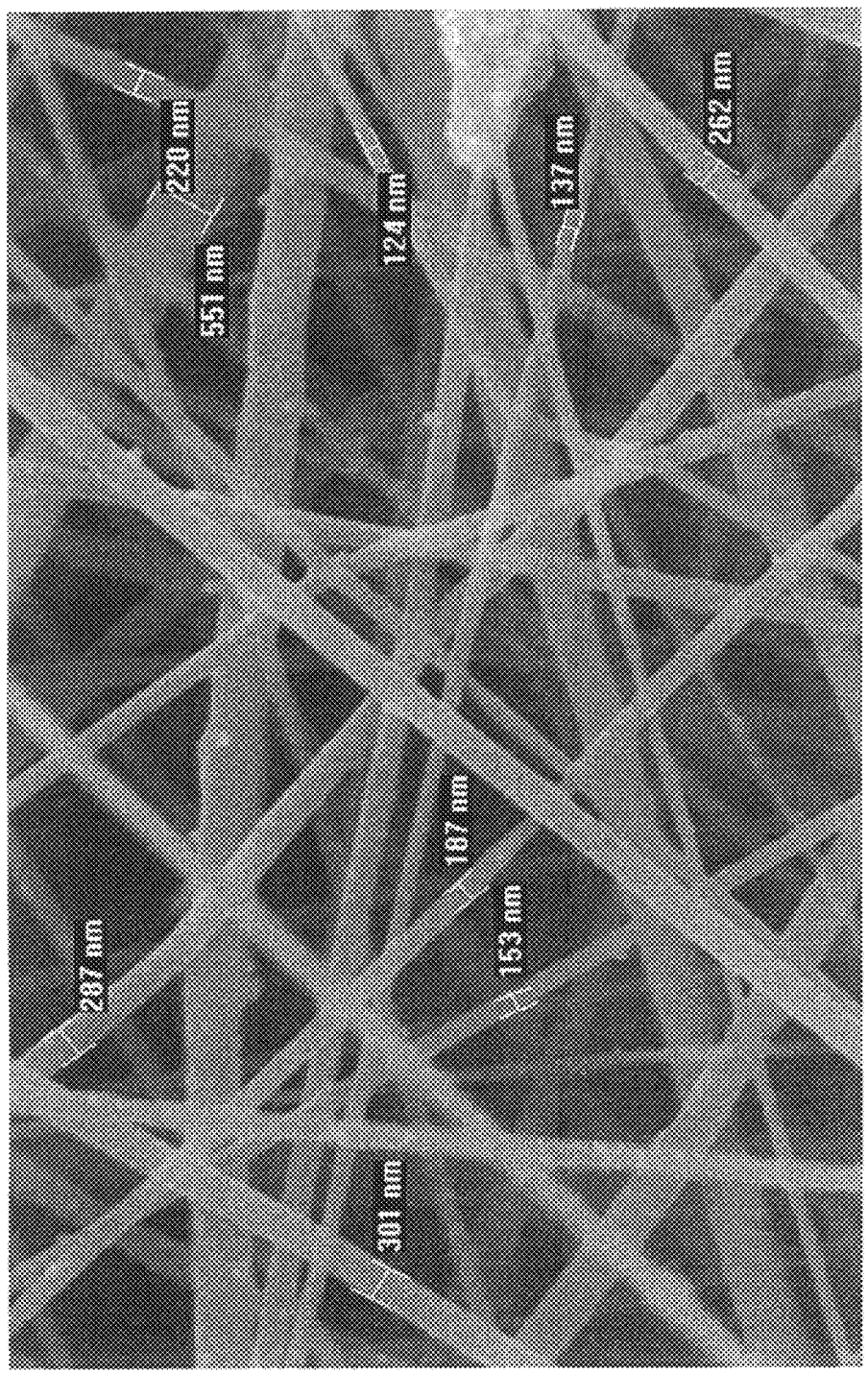
Figure 3B:
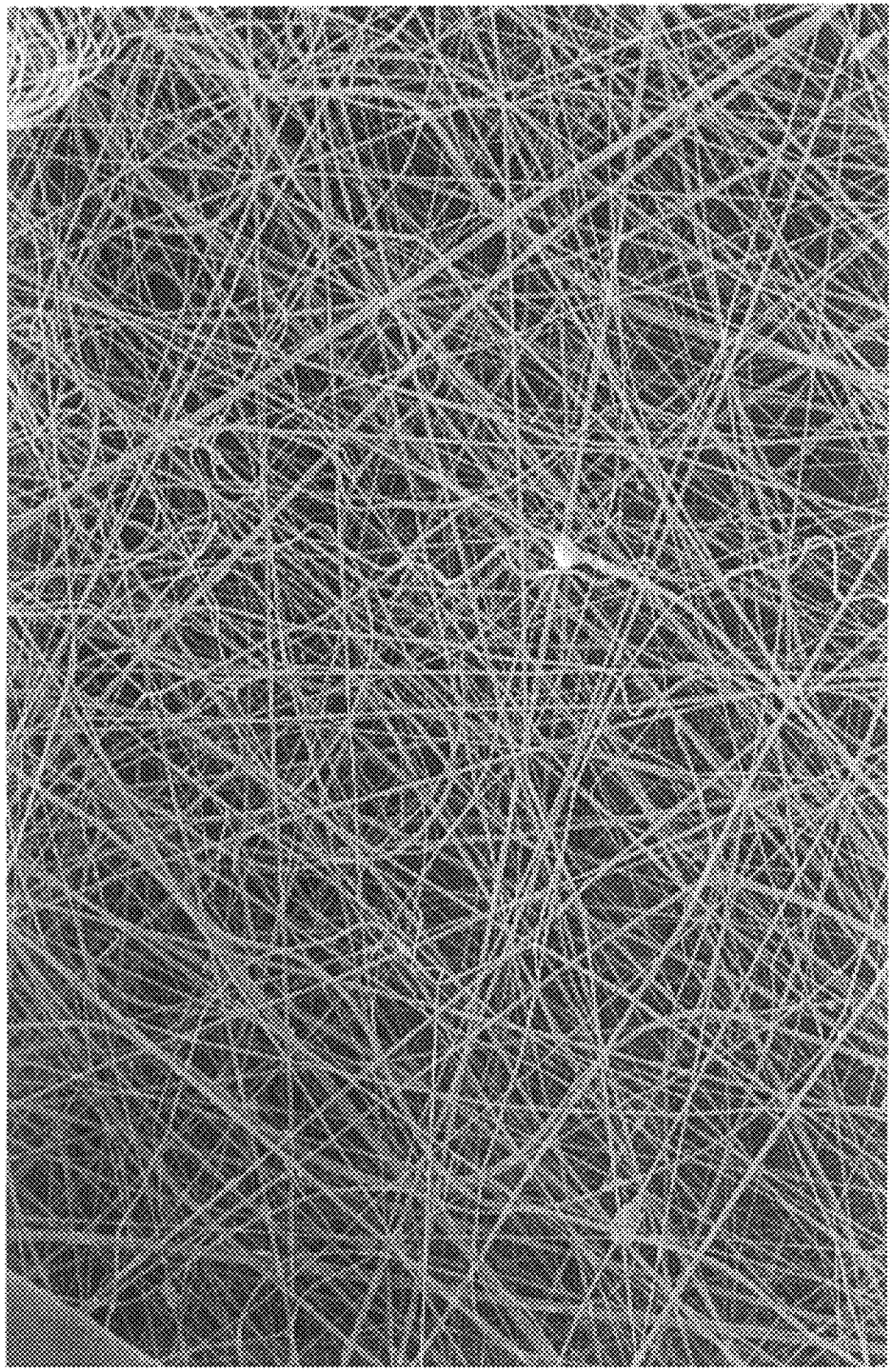

Example 2 was prepared similarly to Example 1, except an electrical field was applied. The electrical field was applied directly to the rotary atomizer by attaching a high voltage cable to the high voltage lug on the back of the rotary atomizer. The rotary atomizer was completely isolated from ground using a large Teflon stand so that the closest ground to the bell-shaped nozzle was the stainless steel sheet metal backing the Reemay collection belt. A +50 kV power supply was used in current control mode and the current was set to 0.02 mA. The high voltage ran at about 35 kV. The lay down of the fiber was much better than in Example 1 in that the coverage was very uniform over the collection area. The fiber size was measured from an image using SEM and determined to be in the range of 100 nm to 500 nm, with an average fiber diameter of about 350 nm. An SEM image of the fibers can be seen in FIG. 3a. FIG. 3b is a SEM image which shows the distribution of the fibers spun according to this Example on the Reemay scrim.

Example 3

Figure 4:
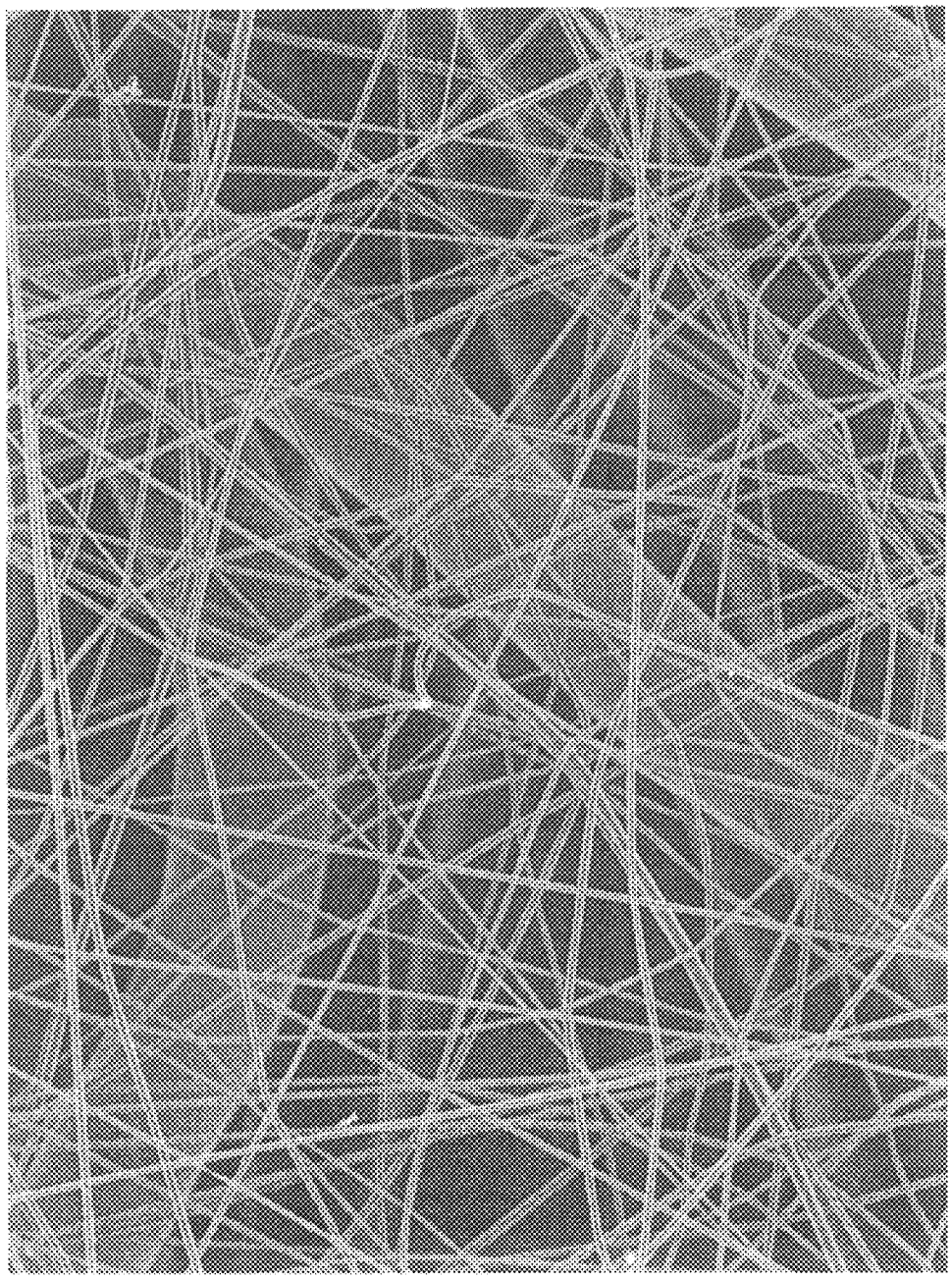

Continuous fibers were made using a 65 mm "Eco Bell" serrated bell-shaped nozzle on a Behr rotary atomizer. A spin solution of 15% Evanol 80-18 poly(vinyl alcohol) and water by weight was mixed until homogeneous and poured into a pressure tank for delivery to the rotary atomizer through the supply tube. The viscosity of the spinning solution was 2,000 cP at 23° C. The pressure on the pressure tank was set to a constant pressure so that the flow rate was measured to be 17 cc/min. The shaping air was set at 100 SL/min. The turbine speed was set to a constant 50,000 rpm. An electrical field was applied directly to the rotary atomizer and the high voltage was set to 50 kV. Fibers were collected on a spunbond/meltblown/spunbond (SMS) composite nonwoven collection screen that was held in place 21 inches away from the bell-shaped nozzle by grounded stainless steel sheet metal. The fiber size was measured from an image using SEM and determined to be in the range of 100 nm to 600 nm with an average fiber diameter of 415 nm. SEM image of the fibers can be seen in FIG. 4.

What is claimed is:

1. A fiber forming process comprising the steps of:
    supplying a spinning solution having at least one polymer dissolved in at least one solvent to a rotary sprayer having a rotating conical nozzle, the nozzle having a curved concave inner surface and a forward surface discharge edge;
    issuing the spinning solution from the rotary sprayer along the curved concave inner surface so as to distribute said spinning solution toward the forward surface of the discharge edge of the nozzle; and
    forming separate fibrous streams which are thrown off the discharge edge by centrifugal force from the spinning solution while the solvent vaporizes to produce continuous polymeric fibers in the absence of an electrical field, wherein the fibers have an average fiber diameter of less than about 1,000 nm;
    wherein the nozzle further comprises a distributor disk for directing the spinning solution towards the concave inner surface of the nozzle.

2. The process of claim 1, wherein the polymer is selected from the group comprising polyalkylene oxides, poly(meth)acrylates, polystyrene based polymers and copolymers, vinyl polymers and copolymers, fluoropolymers, polyesters and copolyesters, polyurethanes, polyalkylenes, polyamides, polyaramids, thermoplastic polymers, liquid crystal polymers, engineering polymers, biodegradable polymers, bio-based polymers, natural polymers, and protein polymers.

3. The process of claim 1, wherein the spinning solution has a concentration of polymer dissolved in solvent of about 1% by weight of polymer to about 90% by weight of polymer.

4. The process of claim 1, wherein the spinning solution can be heated or cooled.

5. The process of claim 1, wherein the spinning solution has a viscosity from about 10 cP to about 100,000 cP.

6. The process of claim 1, wherein the spinning solution is supplied at a throughput rate from about 1 cc/min to about 500 cc/min.

7. The process of claim 1, wherein the rotational speed of the nozzle is between about 10,000 rpm and about 100,000 rpm.

8. The process of claim 1, wherein the average fiber diameter is about 100 nm to about 500 nm.

9. The process of claim 1, further comprising flowing a shaping fluid around the nozzle to direct the spinning solution away from the rotary sprayer.

10. The process of claim 9, wherein the shaping fluid comprises a gas.

11. The process of claim 10, wherein the gas is air.

12. The process of claim 1, further comprising collecting the fiber onto a collector to form a fibrous web.

13. The process of claim 12, further comprising applying a vacuum through the collector to pull the fibers onto the collector to form a fibrous web

* * * * *